United States Patent
De Ding et al.

(10) Patent No.: US 9,282,157 B2
(45) Date of Patent: Mar. 8, 2016

(54) INTERMEDIARY API FOR PROVIDING PRESENCE DATA TO REQUESTING CLIENTS

(71) Applicant: Microsoft Corporation, Redmond, WA (US)

(72) Inventors: Kurt K. De Ding, Seattle, WA (US); Ajay Soni, Kirkland, WA (US); Stephane Taine, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 13/797,612

(22) Filed: Mar. 12, 2013

(65) Prior Publication Data

US 2014/0280464 A1    Sep. 18, 2014

(51) Int. Cl.
*G06F 15/16* (2006.01)
*G06F 15/173* (2006.01)
*H04L 29/08* (2006.01)
*H04L 12/721* (2013.01)
*H04L 29/06* (2006.01)

(52) U.S. Cl.
CPC .............. *H04L 67/24* (2013.01); *H04L 67/28* (2013.01); *H04L 67/327* (2013.01); *H04L 29/06197* (2013.01); *H04L 45/36* (2013.01); *H04L 65/1006* (2013.01)

(58) Field of Classification Search
CPC ...................... H04L 29/06197; H04L 61/3085; H04L 35/1006; H04L 67/24
See application file for complete search history.

(56) References Cited

U.S. PATENT DOCUMENTS

2002/0099738 A1*  7/2002  Grant .................... G06F 9/4443
                                                                715/234
2006/0149811 A1*  7/2006  Bennett ............... H04L 65/1006
                                                                709/203

(Continued)

OTHER PUBLICATIONS

Ding, et al., "Extending Unified Communications Services of UCMA Bots to PIC Clients: Introduction (Part 1 of 5)", Retrieved at <<http://msdn.microsoft.com/en-us/library/jj128290>>, May 2012, pp. 7.

(Continued)

*Primary Examiner* — Jeong S Park
(74) *Attorney, Agent, or Firm* — Jim Ross; Micky Minhas

(57) ABSTRACT

Technologies are generally described for providing an intermediary API for intercepting and processing subscribing requests to a communications server. An intermediary API may intercept a subscribing request from a local or PIC client to receive presence status data from a presentity such as a bot executed on the communications server. The intermediary API may be configured to provide the presence data to a PIC client without consuming the communications server registered subscription limit. The intermediary API may employ a server-supported protocol-specific processing language or module to intercept the subscribing requests, to determine if the request is targeted for one or more bots executed on the communications server, and to determine if the request is for presence data for one or more bots. The intermediary API may determine if the request is non-terminating, and if all criteria are met, may provide presence data to the requesting client.

20 Claims, 6 Drawing Sheets

(56) References Cited

U.S. PATENT DOCUMENTS

| | | | |
|---|---|---|---|
| 2007/0288621 A1* | 12/2007 | Gundu | H04W 8/005 709/223 |
| 2008/0065755 A1* | 3/2008 | Caspi | H04L 67/24 709/224 |
| 2009/0034698 A1* | 2/2009 | Karnalkar | H04W 4/12 379/88.22 |
| 2009/0327441 A1 | 12/2009 | Lee et al. | |
| 2011/0066686 A1* | 3/2011 | Gamaley | H04L 12/1822 709/206 |
| 2011/0231473 A1 | 9/2011 | Narayanan et al. | |
| 2012/0151500 A1 | 6/2012 | Leung et al. | |
| 2012/0278462 A1 | 11/2012 | Lee et al. | |

OTHER PUBLICATIONS

"How to: Show Automaton Presence to PIC Clients", Retrieved at <<http://msdn.microsoft.com/en-us/library/lync/jj265320.aspx>>, Retrieved Date : Dec. 17, 2012, p. 1.

Lakshman, Sarath, "Use XMPP to Create Your Own Google Talk Client", Retrieved at <<http://www.linuxforu.com/2012/06/use-xmpp-to-create-your-own-google-talk-client/>>, Jun. 29, 2012, pp. 8.

Foley, et al., "Instant Messaging as a Platform for the Realisation of a true Ubiquitous Computing Environment", Retrieved at <<http://www.cognitive-management.org/library/inproceedings/2005/foley-cian-2005-echallenges.pdf>>, eChallenges 2005, Oct. 19, 2005, pp. 10.

* cited by examiner

INTERMEDIARY API FOR PROVIDING PRESENCE DATA TO REQUESTING CLIENTS

BACKGROUND

In a communications environment, a communications server associated with an entity such as an enterprise may enable communication services such as instant messaging, presence, and audio/video conferencing as some examples. In some scenarios, the communications server may employ an automated bot to provide automated, centralized, always-on and interactive communication services. Some example automated communication services provided by the bot may include a help desk, a customer service instant messaging service, and a call center. The bot executed on the communications server may publish a presence status to indicate its current communication status, and a user desiring to communicate with the bot may initiate a conversation with the bot based on the published presence status. A user may only be able to initiate a conversation with the bot when the presence status of the bot is online and/or available. In order to receive the presence status of the bot, the user may register with the communications server to receive presence data from a specified bot. The registering user may be referred to as a registered subscriber of the bot.

In order to optimize resources of the communications server, the communications server may define a maximum number of registered subscribers that can concurrently be subscribed to the bot. If a number of registered subscribers attempting to subscribe to the bot exceeds the maximum number set by the communications server, then the bot may appear offline, unknown, or unavailable to any additional registering user, which may cause the additional registering user to be unable to communicate with the bot because the user cannot initiate a conversation with the bot when it is offline and/or unavailable.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an intermediary application programming interface (API) configured to intercept and process a subscribing request for a presence entity (presentity) executed on a communications server. The intermediary API may be configured to intercept a subscribing request from a local client or public internet cloud (PIC) client to receive presence status data from a presentity such as a bot executed on the communications server. The intermediary API may provide the presence data to a PIC client in order to optimize a registered subscription limit of the communications server. The intermediary API may also determine if the request is from a PIC client, determine if the request is targeted for one or more live bots executed on the communications server, and determine if the request is for presence data for one or more live bots. Additionally, the intermediary API may determine if the request is non-terminating, and if all criteria are met, may provide presence data to the requesting PIC client without adding the PIC client as a registered subscriber of the bot.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
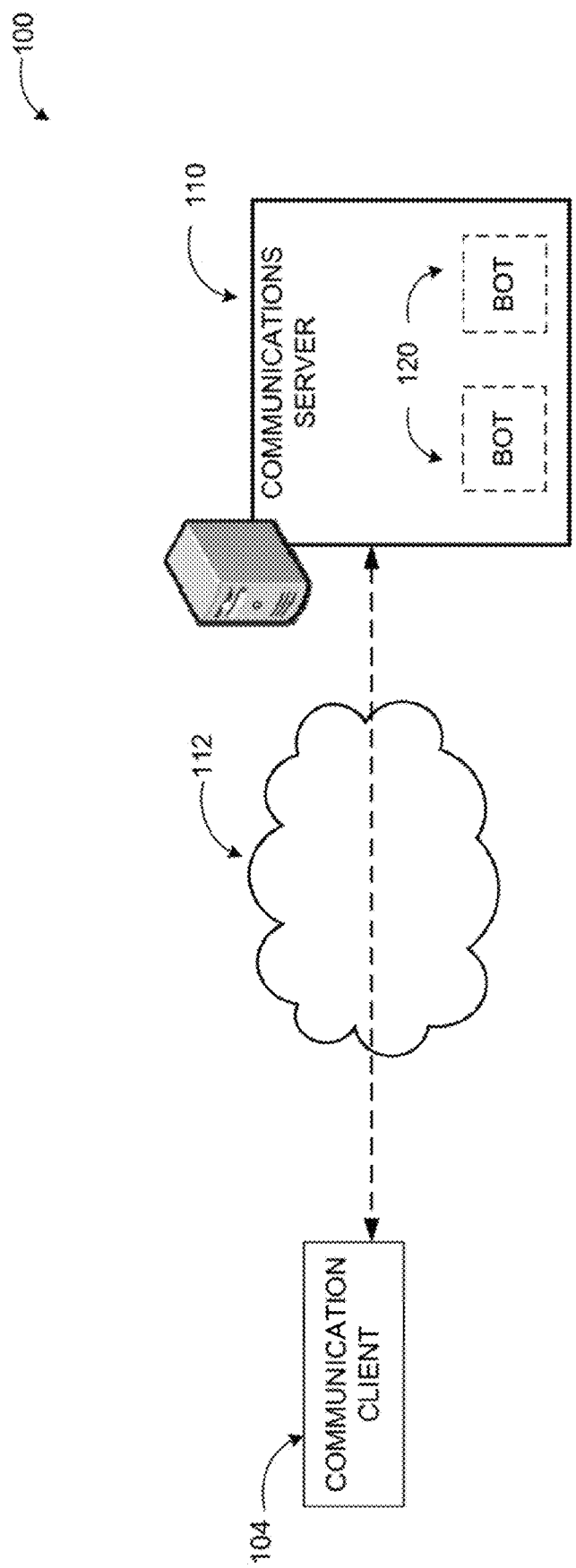
FIG. 1 illustrates an example environment for subscribing to bots at a communications server.

As briefly described above, an intermediary API may be employed by a communications server to intercept a subscribing request from a local client or PIC client to receive presence status data from a presentity such as a bot executed on the communications server. The intermediary API may provide the presence data to a PIC client without adding the PIC client as a registered subscriber of the bot to optimize a registered subscription limit of the communications server. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computer system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing an intermediary API for intercepting and processing subscribing requests to a communications server. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example environment for subscribing to bots at a communications server, where embodiments may be implemented. The computing devices and computing environments shown in diagram 100 are for illustration purposes. Embodiments may be implemented in various local, networked, and similar computing environments employing a variety of computing devices and systems.

As illustrated in diagram 100, a communications server 110 associated with an entity such as an enterprise may enable communication services such as providing the infrastructure for instant messaging, presence, VoIP, ad hoc and structured conferences (audio, video and web conferencing) and PSTN connectivity through a third-party gateway or SIP trunk. These features may be available within an enterprise, an organization, between organizations and with external users on the public internet and/or standard phones (on the PSTN as well as SIP trunking). Clients may communicate with applications executed on the communications server 110 over a network 112 such as a cloud network, and a wired or wireless network, and additionally, clients may communicate with other clients employing the communications services offered by the communications server 110. In some examples, the communications server 110 may provide communications services such as conferencing, email access, text message exchange, and similar ones. Other example communications services provided by the communications server 110 may include, for example, a contact center and a help desk that provides information and responses to an inquiry in a client or user-initiated conversation.

In an example embodiment, the communications server 110 may employ a bot 120 to provide centralized, always-on and interactive communication services. The bot 120 may be an automated program designed to simulate an intelligent conversation and communication with one or more human users via auditory or textual methods. The bot 120 may integrated into dialog systems on the communications server 110 for various practical purposes such as offline help, personalized service, or information acquisition. In an example embodiment the bot 120 may serve as a middle-tier between the enterprise communications server 110 and a client 104, can be created and deployed to provide automated communications services. In an example scenario, the bot 120 may function as a help desk to connect a customer client to an appropriate support staff based on the customer's answers to questions from the bot 120. Another example is an application that provides news feeds or stock quotes that are based on direct user input. In these scenarios, the bot 120 may be a trusted server application executed on the communication server 110 that uses a Unified Communications Managed API (UCMA) and the bot 120 can be added to the contact list of a client, or user accessing the bot 120. An additional example bot may be a shipment tracking bot for prospective recipients to check the shipping progress thorough an instant messaging like conversation or to connect to a supporting staff in a call center if human assistance is needed. Further, a bot may be a call center bot that answers calls from a communications client, to handle customer inquiries via instant messaging, and/or interactive voice response, as the request arrives without forcing a caller wait on hold on a telephone or to answer a series of teleprompter commands.

In an example embodiment, the bot 120 may be referred to us a presentity, indicating that the bot 120 has presence information associated with it such as online status, reachability, and willingness to communicate. Presentity, a combination "presence" and "entity", refers to an entity that has presence information associated with it such as status, reachability, and willingness to communicate. For example, users of an instant messaging service may be referred to as presentities and their presence information may be their user status (online, offline, away, etc.). Presentity may also refer to a resource or role such as a conference room or help desk. Moreover, presentity may also refer to a group of users, for example, a collection of customer service agents in a call center. The bot 120 executed on the communications server 110 may publish a presence state to indicate its current communications status. This published state may inform clients that wish to contact the bot 120 about the bot's availability and willingness to communicate via a set of communication services offered by the communications server 110.

In a system according to embodiments, when a client 104 wishes to initiate a conversation with the bot 120, the bot 120 needs to be running and available on the communications server 110. The client 104, such as an audio, textual, or video messaging application, may not be able to initiate a conversation with the bot 120 unless the client 104 has received a presence status from the bot 120 indicating that the bot 120 is online (running and available). Therefore, the bot 120 may be configured to provide a presence status, and the client 104 may be configured to receive the presence status, and the online presence status of the bot 120 may need to be provisioned to the client 104 so that the client 104 can initiate a conversation with the bot 120. If the client 104 cannot connect to the bot 120 or if the presence data indicates an offline, unknown, or unavailable status of the bot 120, then the client cannot communicate with the bot 120.

In an example embodiment, the client 104 may receive the presence status of the bot 120 by a subscribing to presence data published by the bot 120. In order to subscribe to receive the presence data for the bot 120, the client 104 may register with the communications server 110 to receive specified types of presence data by a specified bot. The registered subscriber may be a PIC client, such that the presence data for the bot 120 executed on the communications server 110 may be provided over the network 112 to the PIC client. The communications server 110 may continuously provide the presence data to the registered subscribers over the network 112.

The registered subscribers of a bot may contribute to a resource consumption of the communications server 110, and often times, the communications server 110 may cap or limit a maximum number of registered subscribers that can concurrently subscribe to a presentity in order to conserve the communications server resources. In a scenario when the bot is oversubscribed (i.e. a number of registering subscribers attempting to subscribe to the presentity exceeds the maximum number set by the communications server 110), then the communications server 110 may prevent clients over the subscriber limit from being included in the bot's subscription list, and may not provide the presence data of the bot 120 to the excluded registering subscribers. As a result, the bot 120 may appear as unavailable, unknown or offline, which may result in that the registering subscriber may not be able to communicate with the 120 bot because the registering subscriber cannot initiate a conversation with the bot when it is offline and/or unavailable. Since a bot may have a large number of registering subscribers, resulting in a bot that is likely to be oversubscribed, any clients beyond the maximum number permitted by the communications server 110 configured registered subscription limit may not receive the presence data of the bot, and cannot initiate communications with the bot 120.

Figure 2:
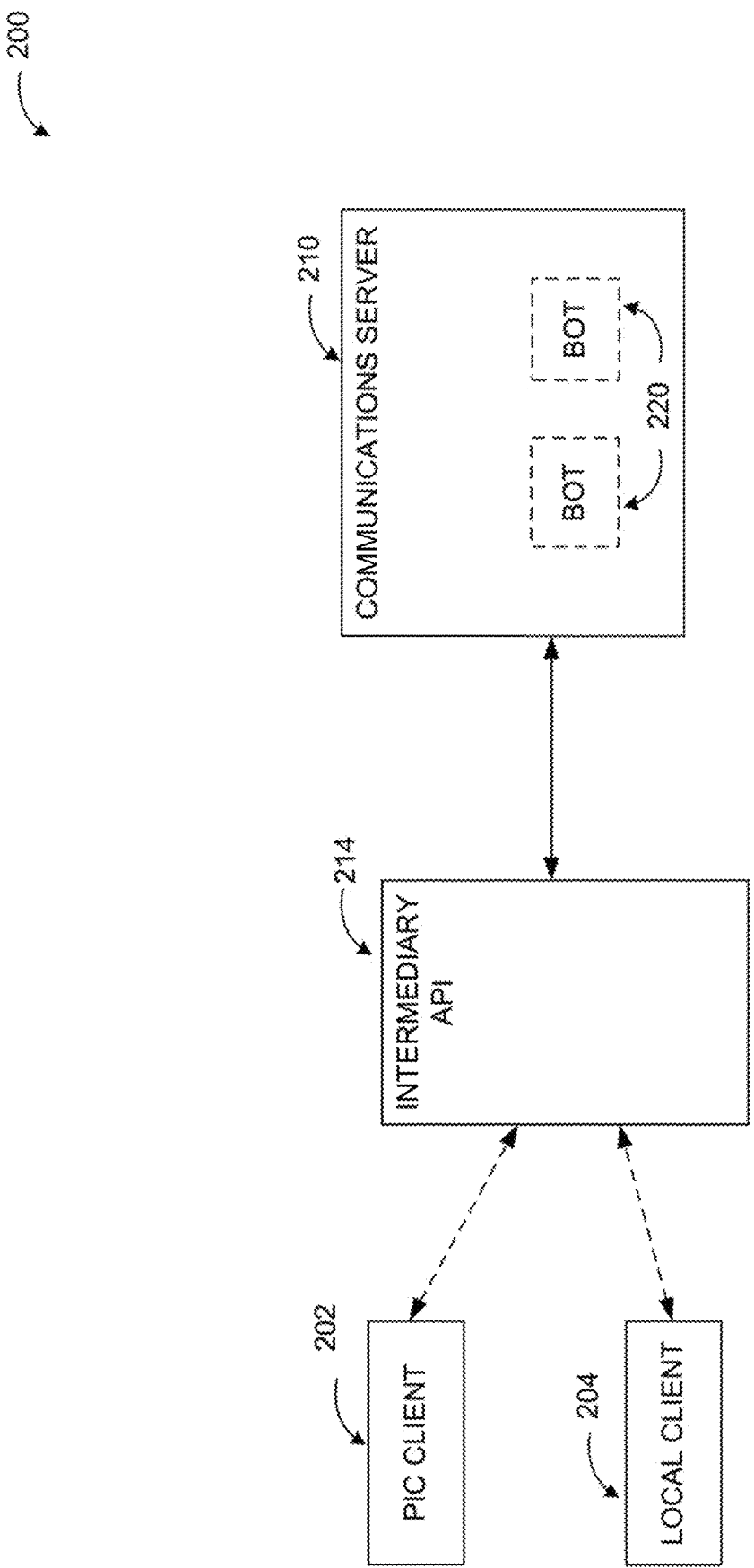
FIG. 2 illustrates an example intermediary API for intercepting subscribing requests to a communications server.

FIG. 2 illustrates an example intermediary API for intercepting subscribing requests to a communications server, according to some embodiments. As illustrated in diagram 200, a client 202, 204 may submit a subscribing request to a communications server 210 for requesting to receive presence data form a presentity, such as a bot 220, executed on the communications server 210. As previously discussed, the bot 220 may become oversubscribed when a number of clients 202, 204 attempting to subscribe to the bot 220 exceeds the maximum number set by the communications server 210. The client may be a PIC client 202, for example and access communication services offered by the communications server 210 remotely. A PIC client crosses network boundary to access the services offered by the server while a local client does not. Both may be remote endpoints, however.

In order to optimize performance to allow a greater number of clients to receive presence data for bots 220 executed on the communications server 210, the communications server 210 may employ an intermediary API 214 to intercept subscribing requests from PIC and local clients 202, 204. If the subscribing request is from a local client 204, the intermediary API may be configured to reroute the subscribing request to the communications server 210 which may be configured to process the subscribing requests itself and may remove the local client request from the bot's contact list. If the subscribing request is from a PIC client 202, however, the intermediary API 214 may be configured to process the subscribing request itself, and may provide presence data for a requested bot without consuming the communications server 210 registered subscription limit.

As will be discussed below in further detail, in a system according to embodiments, the intermediary API 214 may intercept a subscribing request from a PIC client 202, and the intermediary API 214 may process the subscribing request from the PIC client 202 and may parse the subscribing request. The intermediary API 214 may determine a presence status of bots 220 running on the communications server 210, and the intermediary API may respond to the PIC client 202 with the presence status of the bots 220. The intermediary API may provide the presence status for the bots 220 without registering the PIC client 202 as a registered subscriber of the bot 220, enabling the subscription resource consumption of the communications server 210 to be optimized.

In a system according to embodiments, the communications server 210 may employ the intermediary API 214 to provide presence data for a presentity such as a bot to a registering subscriber without reaching the communications server's registered subscription limit. The intermediary API 214 may process the request and may return the presence status of an available bot as always online. In an example scenario, the intermediary API 214 may intercept a subscribing request from a client which may be a local client executed on the communications server 210 or may be a PIC client executed on a remote server and communicating with the communications server 210 over a network. If the request for presence data is from a local client, then the intermediary API 214 may be passed to the communications server 210 for handling the request. In this scenario, the presence status of the bot 220 may be cached in the local client 204, and then any further request may be removed from the bot's 220 subscription list so that the client may not be counted a registered subscriber of the bot 220. The cached presence status may then be used to show the presence status of the bots throughout the subscription session as always online and available, because, typically a bot is, by design, always online. If the subscribing request is by the PIC client 202, then the intermediary API 214 may handle the subscribing request to receive the presence data of the bot 220 executed on the communications server 210, and may process the request itself without affecting the registered subscription consumption of the communications server 210.

In an example embodiment, the intermediary API 214 may be executed on the communications server 210. The subscribing request from the PIC client 202 may be a session initiated protocol (SIP) subscribing request, and the intermediary API 214 may intercept the SIP subscribing request before it processed by the communications server 210. The intermediary API 214 may employ SIP processing language to intercept the SIP subscribing requests messages. The intermediary API 214 may be configured to intercept the SIP subscribing request by creating an application manifest as an XML document, specifying subscribe as the types of messages request to be intercepted. The intermediary API may also embed a script in a SIP processing language to determine if the request is for a presence data subscription for one or more bots 220 executed on the communications server 210, and also if the request is front a PIC client. If both conditions are true, i.e. the request is for a presence data subscription for one or more bots 220, and the requesting entity is a PIC client, then the intermediary API 214 may hold the SIP subscribing request for further processing. If the one or both are not true, then the intermediary API 214 may reroute the request to the communications server 210 for processing. For example, the request may be a subscribing request by local client executed on the communications server 210, which may be processed by the communications server 210, or in another example the request may be a request other than a request for presence data by a PIC client. For example the subscribing request may be a request to receive other kinds of data such as, self-published contact lists, and roaming data, to server-provisioned configuration and policies, as some examples. In order to determine if the request is for a presence data subscription, the intermediary API 214 may be configured to recognize an event header parameter of the SIP subscribing request. For example, for a presence data subscription request, the event header parameter may have a string value of "presence." The above-discussed scenario is for illustration purposes and does not constitute a limitation on embodiments. For example, SIP is only one example communication protocol. Any other communication protocol and server configurations may be used to implement embodiments.

In an example embodiment, in order to determine if the request is from a PIC client, the intermediary API 214 may be configured to recognize a parameter network value indicating a PIC client, such as a "public cloud," parameter value, for example. Additionally, the intermediary API 214 may determine if the subscribing request is a terminating or a non-terminating request. A terminating subscribing request may be a request to cancel an ongoing subscription to the bot indicating the client does not wish to receive any further subscription results or presence data. A non-terminating subscribing request may continue to be processed by the intermediary API 214, while a terminating subscribing request may be sent to the communications server 210. In an example embodiment, the intermediary API 214 may be configured to recognize a terminating subscribing request by an "expires" parameter value included in the subscribing request. For example, an "expires" parameter value of zero may indicate a terminating request, and an "expires" parameter value of greater than zero may indicate a non-terminating request.

Further, the intermediary API 214 may be configured to determine if the intercepted SIP subscribing request is targeted for a live or online bot. In an example embodiment, the intermediary API 214 may determine if the subscribing request is targeted for a live bot by parsing a "to header value" of the subscribing request to obtain a "to URI" value. The "to URI" value may specify the SIP URI of the requested bot. The intermediary API 214 may compare the parsed "to URI value" with currently activated application endpoints which may be live or online bots having internet access. The intermediary API 214 may be configured to continuously maintain awareness of currently installed bots on the communications server 210, and may continuously maintain a local online or offline status of all the currently installed bots. In order to continuously maintain the knowledge of the currently installed bots, the intermediary API 214 may employ communications server 210 cmdlets or comparable means programmatically to obtain a list of available bots running on the communications server 210. The intermediary API 214 may periodically poll the communications server 210 for trusted application endpoints because bots may be registered with the communications server 210 as trusted application endpoints. The polling may be done concurrently with other subscribing request processing by the intermediary API 214.

In an example embodiment, after processing the received SIP subscribing request from the PIC client, if the SIP request is made by a PIC client and is targeted for an installed bot, the intermediary API 214 may return a response to acknowledge successful receipt of the SIP request. The intermediary may respond to the PIC client employing a unified communications manages API (UCMA) to send a presence status of the bots to the PIC client. For example, the intermediary API 214 may return a 200 OK server code to indicate successful receipt of the request. Further, if the intermediary API 214 identifies that the targeted bot of the SIP request is live and online, the request is non-terminating, and the request is made by a PIC client, then the intermediary API 214 may return a response to the PIC client. The response may be a "notify" response which may indicate the online status of the targeted bot. NOTIFY needs to be sent with the dialog-Id of the received SIP subscribe request and that the RecordRoute received in the received SIP subscribe request should reversed to compose the Route header that foes into the Notify. If the intermediary API 214 identifies that the request is not targeted for a live bot, the request is a terminating response, and/or the request is not made by a PIC client, then the intermediary API 214 may reroute the intercepted SIP request to the communications server 210 for processing by the communications server 210.

Figure 3:
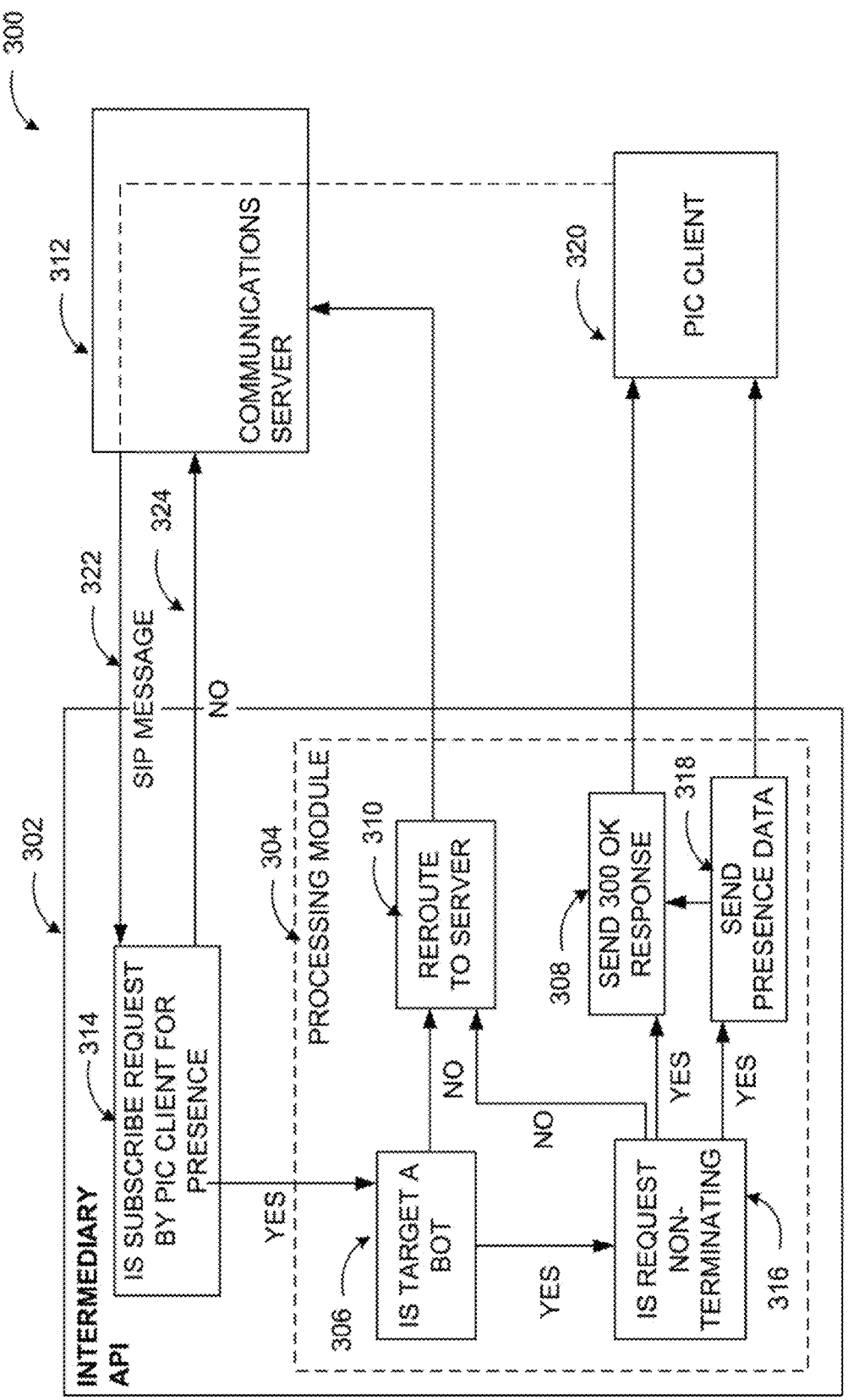
FIG. 3 illustrates an example scenario of interception of a subscribing request from a PIC client to a communications server.

FIG. 3 illustrates an example scenario of interception of a subscribing request from a PIC client to a communications server, according to some embodiments herein. As demonstrated in diagram 300, a communications server 312 may employ an intermediary API 302 to intercept subscribing requests from a PIC client 320 to receive presence data for one or more bots executed on the communications server 312.

The subscribing request from the PIC client 320 may be an SIP subscribing request 322, and the intermediary API 302 may intercept the SIP subscribing request before it reaches the communications server 312. The intermediary API 302 may employ SIP processing language to intercept the SIP subscribing requests messages and may embed a script in a SIP processing language to determine 314 if the request is for a presence data subscription for one or more bots executed on the communications server 312, and also if the request is from a PIC client. If the intermediary API 302 determines the request is for presence data for one or more bots, and the requesting entity is a PIC client, then the intermediary API 302 may route the subscribing request to a processing module 304 for further processing. If the one or both are not true, then the intermediary API 302 may reroute 324 the request to the communications server 312 for processing.

At the processing module, 304, the intermediary API 302 may determine if the intercepted SIP subscribing request is targeted for a live or online bot 306. If the intermediary API 302 identifies that the request is not targeted for a live bot, the intermediary API 302 may reroute 310 the request to the communications server 312 for processing. If the subscribing request is targeted for a live or online bot the intermediary API 302 may determine if the subscribing request is a terminating or a non-terminating request 316. A non-terminating subscribing request may continue to be processed by the intermediary API 302, while a terminating subscribing request may be rerouted 310 to the communications server 312. After processing the received SIP subscribing request from the PIC client, if the SIP request is made by a PIC client and is targeted for an installed bot, the intermediary API 302 may return a response to acknowledge successful receipt of the SIP request, such as a 200 OK server code to indicate successful receipt of the request 308. Additionally, if the intermediary API 302 identifies that the targeted bot of the SIP subscribing request is made by a PIC client, the targeted bot of the SIP subscribing request is live and online, subscribe and the SIP request is non-terminating, then the intermediary API 302 may send 318 a response with the presence data of the requested bot to the PIC client 320.

The example systems in FIGS. 1-3 have been described with specific servers, client devices, configurations, applications, and interactions. Embodiments are not limited to systems according to these example configurations. A platform providing an intermediary API for intercepting and processing subscribing requests to a communications server may be implemented in configurations employing fewer or additional components, configurations, and performing other tasks. Furthermore, specific protocols and/or interfaces may be implemented in a similar manner using the principles described herein.

Figure 4:
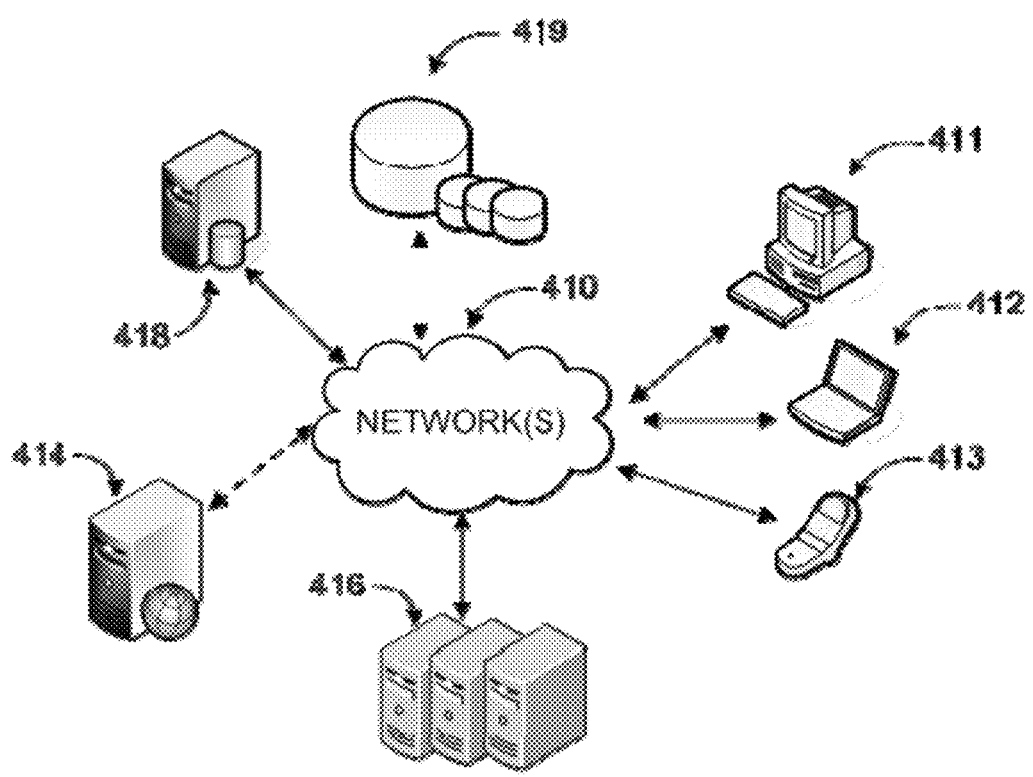
FIG. 4 is a networked environment, where a system according to embodiments may be implemented.

FIG. 4 is an example networked environment, where embodiments may be implemented. A system providing an intermediary API for intercepting and processing subscribing requests to a communications server may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate intercepting and processing subscribing requests to a communications server. The application may provide presence data for a bot requested by a PIC client as discussed previously. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing an intermediary API for intercepting and processing subscribing requests to a communications server. Furthermore, the networked environments discussed in FIG. 4 are for illustration purposes only. Embodiments are not limited to the example applications, modules, or processes.

Figure 5:
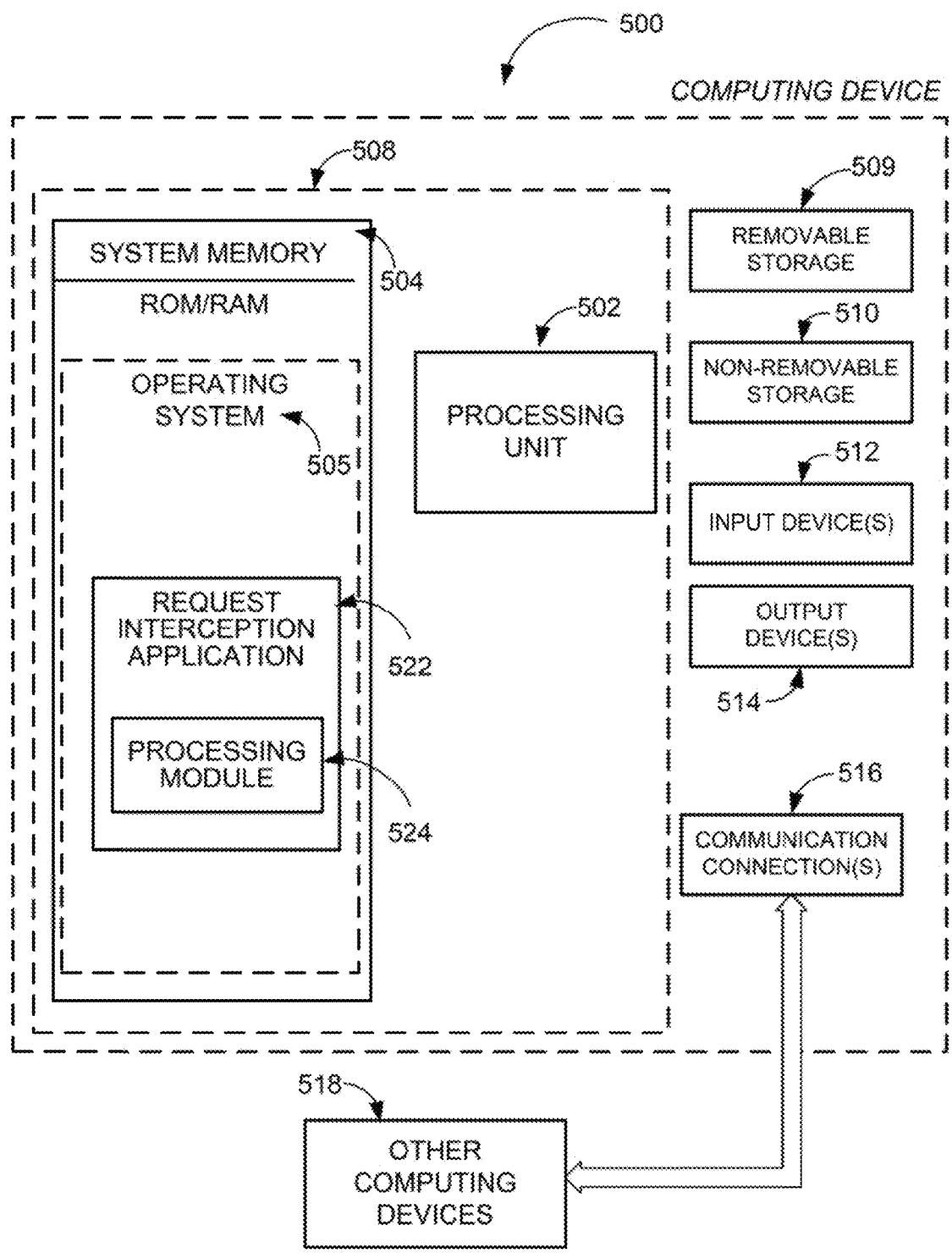
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any portable computing device with wireless communication capabilities, which may include touch and/or gesture detection capability in some examples, and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS®, WINDOWS MOBILE®, or WINDOWS PHONE® operating systems from MICROSOFT CORPORATION of Redmond, Wash. The system memory 504 may also include one or more software applications such as request interception application 522, and processing module 524.

Figure 6:
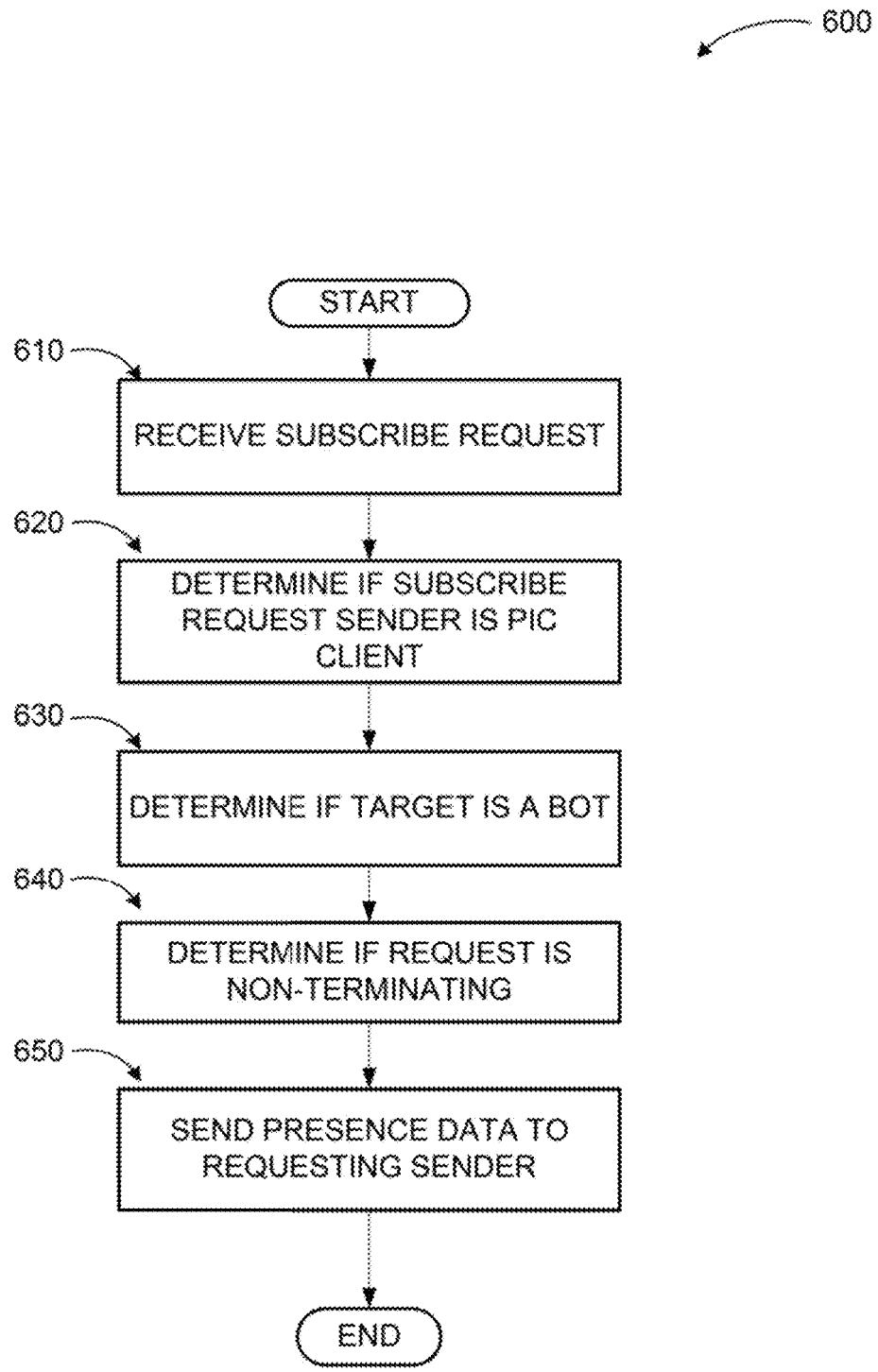
FIG. 6 illustrates a logic flow diagram for a process of providing an intermediary API for intercepting and processing subscribing requests to a communications server according to embodiments.

Application 522 may enable interception of a subscribing request for presence data of a bot from a PIC client. Through a processing module 524, application 522 may determine if the subscribing request is for a live and online bot, and if the request is non-terminating. If the subscribing request meets certain criteria, the application may provide presence data for the bot the requesting client. Application 522 and processing module 524 may be separate application or integrated modules of a hosted service. This basic configuration is illustrated in FIG. 6 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable, storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can he used to store the desired information and which can be accessed by computing device 500. Any such computer readable storage media max be part of computing device 500. Computing device 500 may also base input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 500 may also contain communication connections 516 that allow the device to communicate with other devices 518, such as over a wired or wireless network in a distributed computing environment, a satellite link, a cellular link, a short range network, and comparable mechanism. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

FIG. 6 illustrates a logic flow diagram for process 600 of providing an intermediary API for intercepting and processing subscribing requests to a communications server according to embodiments. Process 600 may be implemented on a server or other computing device.

Process 600 begins with operation 610, where a subscribing request may be received. The subscribing request may be an SIP subscribing request to receive presence data for a bot executed on a communications server, and intermediary API may intercept the SIP subscribing request before it reaches the communications server 312. At operation 620, the intermediary API may determine if the request is from a PIC client. At operation 630, the intermediary API may determine if the intercepted SIP subscribing request is targeted for a live or online bot on the communications server. At operation 640, the intermediary API 302 may determine if the subscribing request is a terminating or a non-terminating request. If the request is non-terminating, operation 640 may be followed by operation 650 where the intermediary API may send the presence data of the requested bot to the PIC client. The presence data for the requested bot may be provided to the PIC client without affecting the registered subscription consumption of the communications server.

The operations included in process 600 are for illustration purposes. Providing an intermediary API for intercepting and processing subscribing requests to a communications server may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for providing an intermediary application programming interface (API) for intercepting and processing subscribing requests to a communications server, the method comprising:
    receiving a subscribing request from a client;
    identifying the client sending the subscribing request;
    determining if a target of the subscribing request is a bot executed on the communications server;
    identifying a route of the subscribing request;
    composing a route header by reversing the route of the subscribing request;
    identifying presence data of a targeted bot of the subscribing request; and
    sending a response to the requesting client, wherein the response includes the presence data of the targeted bot and the route header, wherein the route header is used to transmit the response through a reverse route compared to the route of the subscribing request.

2. The method of claim 1, wherein identifying the client sending the subscribing request comprises:
    identifying if the client is a public internet cloud (PIC) client or a domain-local client associated with the communications server.

3. The method of claim 2, further comprising:
    if the client is a domain-local client associated with the communications server, routing the request to the communications server for processing; and
    if the client is a PIC client, determining if the targeted bot of the subscribing request is online and active on the communication server.

4. The method of claim 1, wherein the subscribing request is a session initiated protocol (SIP) subscribing request.

5. The method of claim 1, further comprising:
    determining if the subscribing request is a request for the presence data of the targeted bot.

6. The method of claim 5, further comprising:
    if the subscribing request is another request other than for the presence data of the targeted bot, routing the request to the communications server for processing.

7. The method of claim 1, further comprising:
    determining if the subscribing request is one of a terminating and a non-terminating subscribing request.

8. The method of claim 7, further comprising:
    if the subscribing request is terminating subscribing request, routing the request to the communications server for processing.

9. The method of claim 1, further comprising:
    maintaining awareness of presence data for one or more bots executed on the communications server.

10. The method of claim 1, further comprising:
    returning the response to the requesting client to acknowledge successful receipt of the subscribing request.

11. A computing device for providing an intermediary application programming interface (API) for intercepting and processing subscribing requests to a communications server, the computing device comprising:
    a memory;
    a processor coupled to the memory, the processor configured to execute a communication application providing an intermediary API, wherein the communication application is configured to:
        intercept a subscribing request through the intermediary API for a presence entity (a presentity) on the communications server from a client;
        determine if the subscribing request is from a public internet cloud (PIC) client;
        determine if the presentity targeted by the subscribing request is a bot executed on the communications server;
        identify a route of the subscribing request;
        compose a route header by reversing the route of the subscribing request;
        identify presence data of a targeted bot of the subscribing request; and
        send a response to a requesting client through the intermediary API without registering the requesting client as a registered subscriber of the bot on communications server, wherein the response includes the presence data of the targeted bot and the route header, wherein the route header is used to transmit the response through a reverse route compared to the route of the subscribing request.

12. The computing device of claim 11, wherein the intermediary API is configured to intercept and to parse the subscribing request to determine if the subscribing request is from the PIC client.

13. The computing device of claim 12, wherein the communication application is further configured to:
    intercept the subscribing request through the intermediary API request by:
        creating an application manifest as an XML document; and
        specifying a message type to be intercepted.

14. The computing device of claim 11, wherein the communication application is further configured to:
    determine if the subscribing request is a request for the presence data of the targeted bot by recognizing a parameter of the subscribing request having a string value of "presence".

15. The computing device of claim 11, wherein the communication application is further configured to:
   maintain awareness of presence data for one or more bots executed on the communications server by periodically polling the communications server for installed and active bots.

16. The computing device of claim 11, wherein the communication application is further configured to:
   return the response to the requesting client through the intermediary API to acknowledge successful receipt of the subscribing request.

17. The computing device of claim 11, wherein the communication application is further configured to:
   route the request to the communications server for processing if at least one of: the subscribing request is not from a PIC client, or the subscribing request is not for presence data of one or more bots executed on the communications server.

18. A computer-readable memory device with instructions stored thereon for providing an intermediary application programming interface (API) for intercepting and processing subscribing requests to a communications server, the instructions comprising:
   intercepting a subscribing request for a presentity on the communications server from a client;
   determining if the subscribing request is from a public internet cloud (PIC) client;
   determining if the presentity targeted by the subscribing request is a bot executed on the communications server;
   determining if the subscribing request is terminating or non-terminating;
   identifying a route of the subscribing request;
   composing a route header by reversing the route of the subscribing request;
   identifying presence data of the targeted bot of the subscribing request; and
   sending a response to the requesting client without registering the requesting client as a registered subscriber of the bot on the communications server, wherein the response includes the presence data of the targeted bot and the route header, wherein the route header is used to transmit the response through a reverse route compared to the route of the subscribing request.

19. The computer-readable memory device of claim 18, wherein the instructions further comprise:
   employing SIP processing language to parse the SIP subscribing request to one or more of: determining if the subscribing request is from the PIC client, determining if the subscribing request is for presence data of one or more bots executed on the communications server, and determining if the subscribing request is one of terminating and non-terminating.

20. The computer-readable memory device of claim 19, wherein the instructions further comprise:
   routing the request to the communications server for processing if at least one of: the subscribing request is not from a PIC client, the subscribing request is a terminating request, and the subscribing request is not for presence data of one or more bots executed on the communications server.

* * * * *